P. Johnson,
Washing Machine.
No. 107,267.  Patented Sep. 13, 1870.
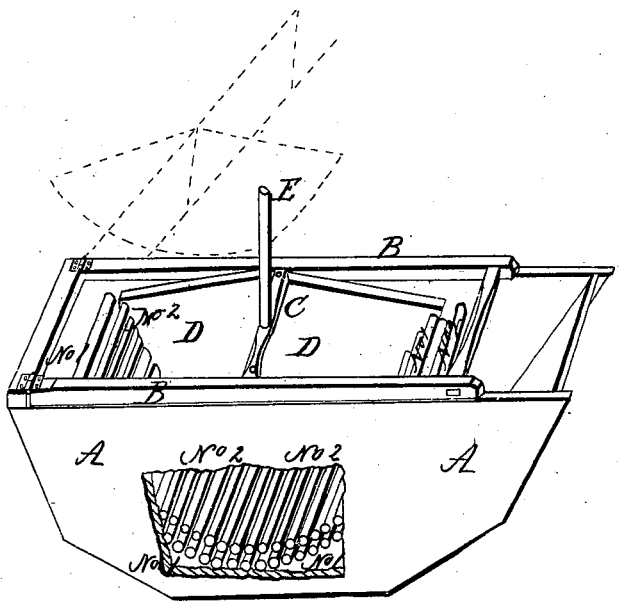
Witnesses:
Louis M. Sguau
W. W. Pierce
Inventor,
Powell Johnson
Thomas G. Orwig
Attorney

United States Patent Office.

POWELL JOHNSON, OF DES MOINES, IOWA.

Letters Patent No. 107,267, dated September 13, 1870.

IMPROVED WASHING-MACHINE.

The Schedule referred to in these Letters Patent and making part of the same.

I, POWELL JOHNSON, of Des Moines, in the county of Polk and State of Iowa, have invented certain Improvements in Washing-Machines, of which the following is a specification.

My invention consists in placing two distinct series of loose rollers in such relative positions that articles to be washed may be placed between the rollers and subjected to the double action of a double series of loose rollers, at one and the same time.

The drawing is a perspective view of my washing-machine, with a part of one side removed, to show the two series of loose rollers.

A A is one of the sides forming the box or tub, and to which the No. 1 series of loose rollers is permanently attached.

B B is an adjustable frame, hinged to the one end and top of the box.

C is an axle, suspended in the adjustable frame.

D is one of the sides holding the No. 2 series of loose rollers, and is permanently fastened to the axle C.

E is a lever passing through the axle C to a bar, which connects the two sides D D.

The dotted lines indicate how the adjustable frame and the suspended No. 2 series of loose rollers may be elevated from the box.

To operate my machine, fill the box or tub about half full of water. The temperature of the water and the quantity of soap used may vary, as desired.

Place the articles to be washed between the two series of rollers, and then work the lever E backward and forward. The weight of the hinged frame, together with the No. 2 series of rollers, will give sufficient pressure upon the goods.

When the No. 2 series of rollers is elevated out of the box or tub, the No. 1 series of rollers may be conveniently used as a wash-board.

Feet may be attached to my machine, or it may be placed upon a bench.

My machine is principally made of wood. Metal and rubber may be used for some parts, if desired. Form and size can be varied, as desired. Gearing may be connected, to move the lever E.

I am aware that loose rollers have been used in wash-boards and washing-machines, and that the crescent forms in which my rollers are placed have been adopted by others, and that a self-adjusting rubbing and pressing power similar to mine is in use; but the use of a double series of loose rollers to produce a double action upon the articles placed between them is new, and greatly advantageous in washing-machines.

Claim.

What I claim as my improvement in washing-machines is—

The construction and arrangement of the two series of loose rollers No. 1 and No. 2, in combination with the adjusting frame B, to which rollers No. 2 are attached, and box A, all as shown and described.

POWELL JOHNSON.

Witnesses:
 SAML. P. IVES,
 GEO. H. MONTGOMERY.